Patented July 13, 1937

2,087,078

UNITED STATES PATENT OFFICE 2,087,078

INSOLUBILIZED HALOGEN CONTAINING BUTADIENE DERIVATIVES

Herbert A. Winkelmann, Chicago, Ill., assignor, by mesne assignments, to Marbo Patents Inc., a corporation of Delaware No Drawing. Application May 10, 1935, Serial No. 20,896

4 Claims. (Cl. 260—1)

This invention relates to the preparation of thermoplastic derivatives of butadiene bodies. More particularly it relates to the preparation of halogen containing rubber derivatives of increased resistance to solvents and plasticizers by means of metallic halides such, for example, as stannic chloride. The invention includes compositions made from them and products containing them.

The Gebauer-Fuelnegg Patent 1,980,396 discloses the reacting of undissolved rubber with dry hydrogen halides including liquefied hydrogen halides. The action of rubber with hydrogen chloride at low temperatures, particularly at or about the atmospheric boiling point of hydrogen chloride, results in the formation of amorphous asymmetrical rubber hydrochloride which is believed to have the following nuclear formula:

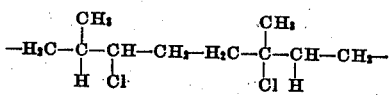

Rubber hydrochloride made by reacting dissolved rubber with gaseous hydrogen chloride at ordinary temperatures is believed to be symmetrical and have the following nuclear formula:

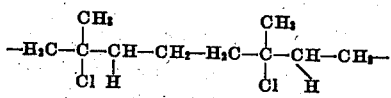

The amorphous asymmetrical compound is much more soluble in benzol, carbon tetrachloride, chloroform, ethylene dichloride, and other materials, and also much less oil and water resistant than the crystalline symmetrical compound.

For some purposes the greater solubility and the lesser resistance of the asymmetrical rubber hydrochloride is a disadvantage, for other purposes it is an advantage. The symmetrical rubber hydrochloride, although relatively insoluble and oil resistant, is also subject to improvement in these respects.

Rubber may also react with chlorine in the liquid, gaseous or dissolved state to give rubber chlorides in which the chlorine may be by addition or by substitution. Chlorinated rubber hydrohalides, hydrochlorinated rubber chlorides, and various physical and molecular mixtures of halides and hydrohalides of rubber may be produced.

It is an object of the present invention to form insoluble and oil resistant reaction products of rubber and hydrogen chloride.

It is also an object of the invention to make insoluble and oil resistant reaction products of rubber and chlorine.

It is a further object of this invention to make a composition of polymerized chloroprene and butadiene hydrohalide reaction product which is less expensive than polymerized chloroprene, but which has similar high tensile strength and oil resisting qualities as polymerized chloroprene.

Other objects will become apparent on reading the specification.

The following procedure in which rubber is used, will illustrate the invention as applied to the production of reaction products of butadiene bodies with liquefied hydrogen halides in the presence of metallic halides.

Sheet pale crepe rubber of about .02″ thickness is brought in contact with liquefied hydrogen chloride at about the boiling point of the hydrogen chloride at atmospheric pressure, containing about 5% stannic chloride. The reaction is substantially complete in five minutes and the resulting product contains about 27% chlorine. It is practically insoluble in solvents such as benzol, ethylene dichloride, carbon tetrachloride, chloroform, turpentine and other substances which will dissolve asymmetrical rubber hydrochloride with ease, and even including substances which are fair solvents for the symmetrical rubber hydrochloride.

The proportion of stannic chloride present in the hydrogen chloride may vary widely. When used as low as 2% a marked decrease in the solubility of the rubber hydrochloride reaction product is obtained over that produced from rubber and hydrogen chloride containing no stannic chloride. Since the stannic chloride is miscible with the liquefied hydrogen chloride it may be used in amounts much in excess of 5%, although in 5% proportion the reaction product is as insoluble as would ordinarily be desired for any commercial use.

The exact theory of the reaction is not entirely understood. The stannic chloride may act as a catalyst in promoting cyclization and polymerization of rubber hydrochlorides, or may enter into the reaction to produce an intermediate addition product which immediately forms with liquefied hydrogen halide a polymerized rubber hydrohalide of insoluble character.

In place of tin tetrachloride there may be used antimony pentachloride, with similar results. Titanium tetrachloride is also operable for the production of an insoluble reaction product.

The reaction is preferably carried out at low temperatures of around −85° C. However, by use of pressure the reaction may be carried out with liquefied hydrogen chloride at higher temperatures.

In place of rubber other butadiene bodies such as polymerized chloroprene, chloroprene, isoprene, balata and gutta percha, and the like may be used. The rubber is, preferably milled pale crepe, but scrap rubber, reclaim and vulcanized rubber may be used. It is preferred to use thin sheets or powdered rubber as the time for obtaining the reaction product is dependent on the rate of diffusion of the liquefied hydrogen into the mass which in turn is dependent on the thickness of the mass.

When polymerized chloroprene is reacted alone with liquefied hydrogen chloride there is little reaction in the time required to complete the reaction for liquefied hydrogen chloride on rubber. It is therefore, possible to produce homogenous mixtures of rubber hydrochloride, polymerized chloroprene, with a small amount of polymerized chloroprene hydrochloride by milling polymerized chloroprene with rubber and reacting the mixture with liquefied hydrogen chloride, preferably in the presence of tin tetrachloride or similar metallic halides.

Other halides than the chlorides may be used. The substance which when used in small amounts with liquefied hydrogen gives an insoluble reaction product and which is the preferred substance is stannic chloride. Liquid hydrogen chloride is preferred but the other liquefied hydrogen halides are operable.

The reaction of rubber with liquefied chlorine which contains tin tetrachloride, antimony pentachloride, titanium tetrachloride results in an insoluble product of different character from the insoluble product produced by reacting rubber with liquefied chlorine in the absence of these metallic halides. Rubber may also be reacted with mixtures of liquefied chlorine and liquefied hydrogen chloride, and reacted consecutively with chlorine and hydrochloride, all in the presence of metallic halides.

The reaction products of rubber with liquefied hydrogen chloride and liquefied chlorine in the presence of tin tetrachloride and other metallic halides, are apparently less stable than ordinary rubber hydrochlorides, but may be calendered or molded, with however, considerable decomposition when stabilizers are absent. They may also be mixed with other materials such as butyl stearate, rosin rubber and polymerized chloroprene, but due to the insolubility of the reaction products it is difficult, if not impossible, to form homogeneous mixtures except by milling. On milling considerable decomposition of the reaction product takes place. By adding stabilizers, and preferably magnesium oxide, the stannic chloride-rubber-hydrogen chloride product may be milled with very little decomposition, the product molded or various materials incorporated with it, and then molded or calendered.

The following formula is given as an illustration of the production of molded products:

| | |
|---|---|
| SnCl4-rubber HCl reaction product | 100 |
| MgO | 25 |
| PbO | 10 |
| FF rosin (wood) | 10 |
| Antioxidant | 2 |
| Amylamine | 1 |

The formula is compounded in a mixing mill to a homogeneous integral mass, and then molded at 220° F. for about 3 minutes. The proportions may vary widely, the above being merely a preferred formula. Any rubber antioxidant may be used. Prior to milling it is also preferred to thoroughly wash the reaction product.

The following formula is given as an illustration of the production of mixed compositions of the stannic chloride reaction product and polymerized chloroprene:

| | |
|---|---|
| Polymerized chloroprene | 50 |
| SnCl4-Rubber HCl reaction product | 50 |
| Rosin | 10 |
| MgO | 20 |
| PbO | 10 |
| Antioxidant | 2 |
| Amylamine | 1 |

In place of or in addition to the polymerized chloroprene there may be used rubber hydrochloride or rubber. Mixture of the polymerized rubber hydrochloride and polymerized chloroprene in approximately equal proportions have tensile strength nearly as high as polymerized chloroprene, together with high resistance to oils and solvents. Mixtures of polymerized chloroprene and the reaction product of hydrogen chloride on partially vulcanized rubber such as scrap and reclaimed rubber also have high tensile strength and improved resistance to oils and solvents.

These mixtures are milled in any type of milling machine to obtain homogeneous integral masses, and then may be molded. On cold molding at 220° F. for three minutes a hard type of product is obtained. On curing at temperature of 300° F. for around twenty minutes a vulcanized soft type of product is obtained.

It is to be understood that the invention is not limited to the details above described, but that it comprehends broadly the action of halogen or hydrohalides, or mixtures thereof, and butadiene polymers in the presence of metallic halides. The metallic halides may be dissolved or suspended in the liquefied hydrogen halide or may be mixed with the butadiene polymer which may be in the solid state or in solution. For the production of the preferred reaction product metallic halides having at least four halogen atoms are used such as tin tetrachloride, titanium tetrachloride, and antimony pentachloride. The metallic halides may be mixed with the undissolved rubber which may be reacted with either liquefied or gaseous halides and hydrogen halides, or the metallic halides may be mixed in a rubber solution which may be reacted with gaseous halides or hydrogen halides. The use of metallic halides of the stannic chloride type is preferred, however, in the reactions which normally produce a soluble type of halogen containing rubber derivative.

I claim:

1. The method of producing a rubber hydrohalide which comprises reacting rubber with a liquefied hydrogen halide containing an amphoteric metal halide from the group consisting of stannic halide, antimony pentahalide and titanium tetrahalide.

2. The method of producing a rubber hydrochloride which comprises reacting rubber with liquefied hydrogen chloride containing stannic chloride.

3. The method of producing a rubber hydrochloride which comprises subjecting thin sheet rubber at approximately −85° C. to a solution of stannic chloride in liquefied hydrogen chloride.

4. The method which comprises subjecting a mixture of rubber and polymerized chloroprene to a solution of stannic chloride in liquefied hydrogen chloride.

HERBERT A. WINKELMANN.